Patented Sept. 28, 1948

2,449,989

UNITED STATES PATENT OFFICE 2,449,989

PREPARATION OF BETA-THIO CARBOXYLIC ACIDS

Thomas L. Gresham, Akron, Ohio, assignor to The B. F. Goodrich Company, New York, N. Y., a corporation of New York No Drawing. Application October 5, 1945, Serial No. 620,657

6 Claims. (Cl. 260—526)

This invention relates to the preparation of beta-substituted carboxylic acids, particularly propionic acids, in which a thio linkage, —S—, is attached to the carbon atom in beta position to the carboxylic acid group, and is particularly concerned with the preparation of beta-mercapto carboxylic acids and beta-thio-dicarboxylic acids by the reaction of beta-lactones with inorganic sulfides.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

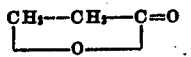

is economically obtained from ketene and formaldehyde.

I have now discovered that beta-propiolactone, and also the other beta-lactones, will react with water-soluble inorganic sulfides in the presence of a polar solvent for the reactants such as water or alcohol to produce beta-thio carboxylic acid compounds; and that this reaction provides a convenient and economical route to numerous useful organic compounds many of which have heretofore been obtained only with difficulty and/or from relatively costly raw materials.

The water-soluble inorganic sulfide utilized to react with the beta-lactone may be hydrogen sulfide, ammonium sulfide or hydrosulfide, or an alkali metal sulfide or hydrosulfide such as sodium hydrosulfide, sodium sulfide, potassium sulfide or lithium hydrosulfide. Alkaline earth metal sulfides and hydrosulfides are also somewhat soluble in water and may be, but are not preferably, used. In carrying out the reaction it is preferable to form a solution containing hydrosulfide ions by bubbling hydrogen sulfide into an aqueous or alcoholic solution of a base such as ammonium or an alkali metal hydroxide, or of a sulfide such as sodium sulfide, and then to add the beta-lactone to this solution, but it is also possible to dissolve the sulfide in water, or an alcohol or other polar solvent therefor, and mix this solution with the beta-lactone either as such or dissolved in a further quantity of the solvent.

After the reactants are brought into contact and allowed to react with one another, the solution is acidified if alkaline, as is preferably the case, and the product obtained is separated from the solution. The product consists ordinarily of a mixture of a beta-mercapto carboxylic acid and a beta-thio-dicarboxylic acid. These beta-thio-carboxylic acids are then separated by distillation, or by any other method, if desired.

When beta-propiolactone is added to a solution containing hydrosulfide ions (such as formed by adding hydrogen sulfide to a solution of an alkali such as sodium hydroxide) and the reaction solution acidified, as is the preferred procedure, the reaction produces thiohydracrylic acid (beta-mercapto propionic acid) as the principal product in accordance with the following equation:

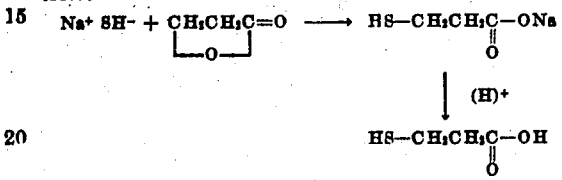

However, a small amount of beta-thio dipropionic acid (bis(2-carboxyethyl) sulfide) is also formed, probably by the following reaction:

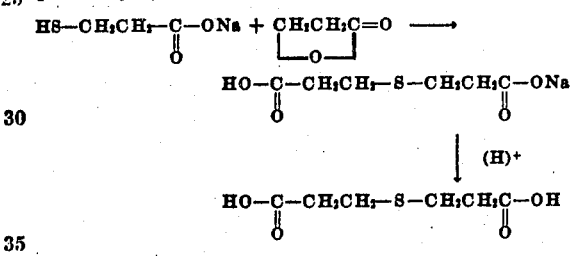

The combined amounts of the two materials account for 80 to 100% yield of product.

The following examples in which parts are by weight, further illustrate this preferred procedure.

Example 1

An aqueous solution of sodium hydroxide is prepared from 250 parts (6.25 moles) of the base and 850 parts of water. The solution is cooled and stirred and hydrogen sulfide passed into the solution until 215 parts (6.32 moles) thereof are absorbed. After cooling the resulting sodium hydrosulfide solution to −25° C., 212 parts (3 moles) of beta-propiolactone are added slowly over a period of 1½ hrs. while stirring constantly and cooling sufficiently to maintain the temperature between −25 and −10° C. The reaction solution is then allowed to warm to 0° C. or higher and is made acid by the addition of a sufficient quantity of concentrated hydrochloric acid. It is then extracted with ether to remove the organic product, the ether evaporated and the product fractionally distilled. A fraction distilling at 85-86° C. at 3 mm. pressure consists of 279 parts (87.4%) of substantially pure thio-hydracrylic acid. The residue, which solidifies when cooled at atmospheric pressure, is recrystallized from acetone-benzene and 19.5 parts (7.3%) of a white crystalline material melting at about 120° C. and identified as beta-thio dipropionic acid, is obtained. The total yield of the two products is 94.7% based on the beta-propiolactone.

*Example 2*

When the above example is repeated except that equimolecular proportions of sodium hydroxide, hydrogen sulfide and beta-propiolactone are used, a 71.5% yield of thiohydracrylic acid and 21.1% yield of beta-thio dipropionic acid is obtained. This example, compared with the previous example, shows that the reaction leading to the diacid is suppressed by employing an excess of the hydrosulfide. Accordingly, when it is desired to obtain a beta-mercapto carboxylic acid in highest yields the use of more than 1 and preferably from about 1.5 to 5 molecular proportions of hydrosulfide to each molecular proportion of beta-lactone is preferred, although as shown by this example the proportions of reactants are by no means critical to the carrying out of the reaction and may be varied as desired.

*Example 3*

The procedure of Example 1 is again repeated except that the temperature of the hydrosulfide solution at the start of the addition is 30° C. and is allowed to rise to about 75° C. during the addition. The yield of thiohydracrylic acid is 68.4%, and of beta-thio dipropionic acid is 7.2%. This example compared with Example 1 shows that the temperature of reaction is not critical, temperatures varying from −25° C. or lower to 75 to 100° C. or even higher being operable, but that highest yields are secured at temperatures below room temperature (i. e., below about 25° C.) and preferably at −25 to 0° C.

*Example 4*

Hydrogen sulfide is passed into a solution of 42.1 parts (slightly more than 1 mole) of sodium hydroxide dissolved in about 235 parts of ethanol, until the solution is saturated. 72 parts (1 mole) of beta-propiolactone are then slowly added to this solution with stirring and while maintaining the temperature of the solution at 0-10° C. As the beta-lactone is added to the alcoholic solution, the sodium salt of thiohydracrylic acid, being relatively insoluble in alcohol, precipitates. After the addition, water is added to dissolve the salt, the solution is acidified with hydrochloric acid, the alcohol removed, the aqueous solution remaining extracted with ether and the ether extract distilled. 83.7 parts (79%) of thiohydracrylic acid and 5.1 parts (5.7%) of beta-thio dipropionic acid are obtained.

Other alcohol solvents such as methanol and other organic polar solvents in which the sulfide will dissolve and ionize and which also dissolve the lactone, may be substituted for ethanol in this example with similar results.

*Example 5*

A solution containing 2.4 molecular proportions of sodium hydro sulfide is prepared by adding 1.2 molecular proportions of hydrogen sulfide to an aqueous solution containing 1.2 molecular proportions of sodium sulfide. One molecular proportion of beta-propiolactone is then added to this solution at a temperature of 8-28° C. The reaction solution is acidified and the products separated as in the previous examples. A 70% yield of thiohydracrylic acid and a 5% yield of beta-thio dipropionic acid are obtained, thus showing that results similar to those of the preceding examples are secured regardless of how a solution containing hydrosulfide ions is obtained.

The reaction may also be carried out by utilizing a solution of hydrogen sulfide or by passing hydrogen sulfide into a solution of the beta-lactone, but in this instance it is generally necessary to work under pressure in order that sufficient hydrogen sulfide be dissolved. In this event the solution is acid rather than alkaline, hence solutions of any desired pH may be used.

In all the preceding examples the sulfide solution reacted with the beta-lactone contains predominately hydrosulfide ions rather than sulfide ions. If a solution of sodium sulfide or the like, which contains sulfide ions in excess of hydrosulfide ions, be used, the reaction yields more of the beta-thio dicarboxylic acid than of the beta-mercapto acid, as illustrated by the following example.

*Example 6*

72 parts of beta-propiolactone are rapidly added to a stirred solution of 94 parts of sodium sulfide dissolved in 400 parts of water, the temperature of the solution being from 6 to 24° C. After acidifying the solution the reaction products are isolated. A 22% yield of beta-thio dipropionic acid and a 10% yield of thiohydracrylic acid are obtained.

Although the total yield secured by the procedure of this example is lower than in the preceding examples, the procedure may be advantageous when the product desired is the beta-thio-dicarboxylic acid.

Although the preparation of thiohydracrylic acid and beta-thiodipropionic acid from beta-propiolactone is the preferred embodiment of the invention, the homologs of beta-propiolactone, that is other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-methyl-beta-butyrolactone, beta-methyl-beta-valerolactone and the like, may also be used to produce other beta-thio carboxylic acids. For example, beta-mercapto-butyric acid and beta-thio dibutyric acid (bis(1-methyl-2-carboxy ethyl) sulfide) may be obtained from beta-butyrolactone. Similarly, other lactones of beta-hydroxy mono-carboxylic acids including those containing cycloalkyl, aryl and aralkyl substituents, such as beta-cyclohexyl-beta-propiolactone, beta-phenyl-beta-propiolactone, alpha-phenyl-beta-propiolactone, beta-benzyl-beta-propiolactone and the like may also be used to yield other beta-thio carboxylic acids. All of the above-mentioned beta-lactones are of the general structure

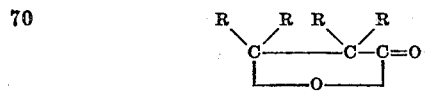

wherein R is hydrogen or an unreactive hydrocarbon group (i. e., a hydrocarbon group free from aliphatic unsaturation) and may be prepared in the manner described in the above-mentioned Küng patent. Still other beta-lactones are known and are also contemplated by this invention. Among these are beta-lactones of unsaturated beta-hydroxy carboxylic acids, mono-lactones of dicarboxylic acids and dilactones of dicarboxylic acids in which at least one of the lactones is beta. Examples of these lactones include alpha, alpha-dimethyl-beta-propiolactone-beta carboxylic acid; trimethyl-beta-propiolactone-beta-carboxylic acid; beta-beta-dimethyl - beta - propiolactone - alpha - carboxylic acid; and the beta, delta-dilactone of citrylidene malonic acid, all of which, like the beta-lactones before mentioned, are, except for carbonoxy structure

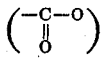

composed exclusively of hydrogen and carbon atoms. Still other beta-lactones contain, in addition to carbonoxy structure and hydrogen and carbon atoms, other elements such as oxygen, nitrogen, sulfur and halogen which may be present in essentially unreactive structure such as nitro groups and ether linkages or in radicals containing reactive hydrogen such as amino and hydroxy. Examples of such latter compounds are alpha or beta-nitrophenyl-beta-propiolactone; beta - (O-nitro-m-chlorophenyl) -beta-propiolactone; beta- (O - nitro-m - methoxyphenyl) - beta-propiolactone; alpha-hydroxy-beta-phenyl-beta - propiolactone and alpha - bromo - beta-beta-dimethyl-beta-propiolactone-alpha-carboxylic acids.

Thus, any of the generic class of beta-lactones may be used in the practice of this invention. When the reaction is carried out in aqueous solution beta-lactones soluble in water (those beta-lactones containing no more than six carbon atoms generally possess this property) are of course used.

Numerous variations and modifications in the invention as described will be apparent to those skilled in the art and are within the spirit and scope of the appended claims.

I claim:

1. The method of preparing a beta-thio-carboxylic acid compound which comprises reacting in a polar solvent for the reactants a saturated aliphatic beta-lactone and a water-soluble inorganic sulfide.

2. The method of preparing thiohydracrylic acid which comprises adding beta-propiolactone to a solution of a hydrosulfide in a polar solvent which dissolves the lactone, and then acidifying the solution.

3. The method of preparing thiohydracrylic acid which comprises reacting beta-propiolactone and a hydrosulfide in a polar solvent for the reactants.

4. The method which comprises adding beta-propiolactone to an aqueous alkaline solution containing hydrosulfide ions, acidifying the solution, and separating thiohydracrylic acid from the reaction mixture.

5. The method which comprises adding hydrogen sulfide to an aqueous solution of an alkali, adding beta-propiolactone to the solution at a temperature of −25 to 25° C., acidifying the solution and then separating thiohydracrylic acid.

6. The method of preparing thiohydracrylic acid and beta-thio dipropionic acid which comprises reacting in a polar solvent for the reactants beta-propiolactone and a water-soluble inorganic sulfide.

THOMAS L. GRESHAM.

REFERENCES CITED

The following references are of record in the file of this patent:

UNITED STATES PATENTS

| Number | Name | Date |
| --- | --- | --- |
| 2,163,176 | Keyssner | June 20, 1939 |
| 2,361,036 | King | Oct. 24, 1944 |
| 2,382,036 | Bruson | Aug. 14, 1945 |

OTHER REFERENCES

Johansson, "Ber. Deut. Chem.," vol. 48, pages 1262–1266 (1915).

Johansson, "Chem. Zentrallblatt," vol. 1916, part II, pages 557–558.

Blaise, "Comptes Rendus," (Fr. Acad. Sci.), vol. 124, pages 89–90 (1897).

Blaise, "Bull. Soc. Chim. de France," (3), vol. 29, pages 335–336 (1903).

Blanc, "Bull. Soc. Chim. de France," (3) vol. 33, pages 886–890 (1905).

MacArdle, "Solvents in Synthetic Organic Chemistry," (1925) pages 1–3.